(12) United States Patent
Huang et al.

(10) Patent No.: US 10,237,390 B2
(45) Date of Patent: Mar. 19, 2019

(54) INTELLIGENT NOTIFICATION DEVICE AND INTELLIGENT NOTIFICATION METHOD

(71) Applicant: ASUSTeK COMPUTER INC., Taipei (TW)

(72) Inventors: Min-Che Huang, Taipei (TW); Kuo-Chung Chiu, Taipei (TW); Hsiao-Kai Li, Taipei (TW); Chia-Hsin Yang, Taipei (TW); Tsung-Han Tsai, Taipei (TW); Wei-Chi Yen, Taipei (TW); Shih-Hao Ke, Taipei (TW); Shu-Hui Chou, Taipei (TW); Wei-Ting Lin, Taipei (TW); Wen-Chieh Tseng, Taipei (TW); Ting-Yu Chen, Taipei (TW); Shuan-Yi Chu, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 108 days.

(21) Appl. No.: 15/203,801

(22) Filed: Jul. 7, 2016

(65) Prior Publication Data

US 2017/0013111 A1 Jan. 12, 2017

(30) Foreign Application Priority Data

Jul. 9, 2015 (TW) .............................. 104122346 A

(51) Int. Cl.
*H04L 12/58* (2006.01)
*H04M 1/725* (2006.01)

(52) U.S. Cl.
CPC ........ *H04M 1/72533* (2013.01); *H04L 51/04* (2013.01); *H04M 1/72566* (2013.01)

(58) Field of Classification Search
CPC ............. H04M 19/04; H04M 1/72566; H04M 1/72569; H04M 19/045; H04M 1/575;
(Continued)

(56) References Cited

U.S. PATENT DOCUMENTS 7,792,815 B2 * 9/2010 Aravamudan .... G06F 17/30035
707/708
2004/0203673 A1 * 10/2004 Seligmann ........ H04M 1/72547
455/415
(Continued)

FOREIGN PATENT DOCUMENTS

CN 103944747 7/2014
TW 201028030 7/2010
WO 2010079388 7/2010

*Primary Examiner* — Golam Sorowar
(74) *Attorney, Agent, or Firm* — JCIPRNET

(57) ABSTRACT

An intelligent notification device is provided. The intelligent notification device is adapted to communicate with at least one electronic device. The intelligent notification device includes a detecting device and a controller. The detecting device detects a status parameter of at least one user and an enviromental parameter of the electronic device. The controller is electrically connected to the detecting device to control the electronic device to notify one of a plurality of events in an event schedule according to the event schedule and to dynamically adjust a time sequency of the events in the event schedule according to at least one of the enviromental parameter and the status parameter. An intelligent notification method is further provided.

16 Claims, 4 Drawing Sheets

(58) Field of Classification Search
CPC ............ H04M 1/663; H04M 1/72519; H04M 1/72544; H04M 1/72547; H04M 1/72552; H04M 1/72572; H04M 2242/14; H04M 2242/30; H04M 2250/10; H04M 2250/12; H04M 3/436; G06Q 10/107; G06Q 10/10; H04L 51/24; H04L 51/26; H04L 12/581; H04L 12/587; H04L 12/589; H04L 51/04; H04L 12/1813; H04L 12/2827; H04L 12/5855; H04L 29/06; H04L 51/00; H04L 51/14; H04L 51/36; H04L 67/12; H04L 67/16; H04L 67/18; H04L 67/24
See application file for complete search history.

(56) References Cited

U.S. PATENT DOCUMENTS

| | | | |
|---|---|---|---|
| 2008/0294490 | A1 | 11/2008 | Nuhaan et al. |
| 2009/0099992 | A1* | 4/2009 | Horvitz ............... G05B 19/404 706/46 |
| 2011/0231216 | A1 | 9/2011 | Fyke et al. |
| 2012/0271676 | A1* | 10/2012 | Aravamudan ..... G06Q 10/1093 705/7.18 |
| 2013/0067549 | A1* | 3/2013 | Caldwell ............ H04L 67/2809 726/7 |
| 2013/0252591 | A1* | 9/2013 | Sasaki .................. H04W 4/001 455/414.1 |
| 2014/0207734 | A1 | 7/2014 | Lin et al. |
| 2015/0241860 | A1* | 8/2015 | Raid ..................... G05B 15/02 700/275 |

\* cited by examiner

INTELLIGENT NOTIFICATION DEVICE AND INTELLIGENT NOTIFICATION METHOD

CROSS-REFERENCE TO RELATED APPLICATION

This application claims the priority benefit of Taiwan application serial No. 104122346, filed on Jul. 9, 2015. The entirety of the above-mentioned patent application is hereby incorporated by references herein and made a part of specification.

BACKGROUND OF THE INVENTION

Field of the Invention

The invention relates to an electronic device and an operating method thereof and, specifically to, an intelligent notification device and an intelligent notification method thereof.

Description of the Related Art

With the rapid development of communication technology, network environment is widespread. The informational and digital smart life style is a trend, such as "digital home". In a digital home system, portable electronic devices communicate with a control center of the digital home system via a wide area network (WAN) and/or a local area network (LAN). However, the control center generally utilizes various information devices to record events and output notifications. One information device notifies to one corresponding user. The time sequence of the events in the event schedule could not be adjusted dynamically according to environmental changes or a busy status of the user.

BRIEF SUMMARY OF THE INVENTION

According to a first aspect of the present disclosure, an intelligent notification device, adapted to communicate with at least one electronic device, the intelligent notification device comprises: a detecting device detecting a status parameter of at least one user and an environmental parameter of the electronic device; and a controller electrically connected to the detecting device to control the electronic device to notify one of a plurality of events in an event schedule according to the event schedule and to dynamically adjust a time sequence of the events in the event schedule according to at least one of the environmental parameter and the status parameter.

According to a second aspect of the present disclosure, an intelligent notification method adapted to the intelligent notification system, the intelligent notification system includes at least one electronic device and an intelligent notification device, the intelligent notification method comprises: detecting a status parameter of at least one user and an environmental parameter of at least one electronic device; adjusting dynamically a time sequence of a plurality of events in an event schedule according to at least one of the environmental parameter and the status parameter; and controlling the electronic device whether to notify one of the events in the event schedule according to the event schedule.

In sum, in embodiments, the intelligent notification device executes the intelligent notification method to dynamically adjust the time sequence of multiple events in the event schedule to determine whether to control the electronic device to notify, postpone the notification or not to notify the event.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

Figure 1:
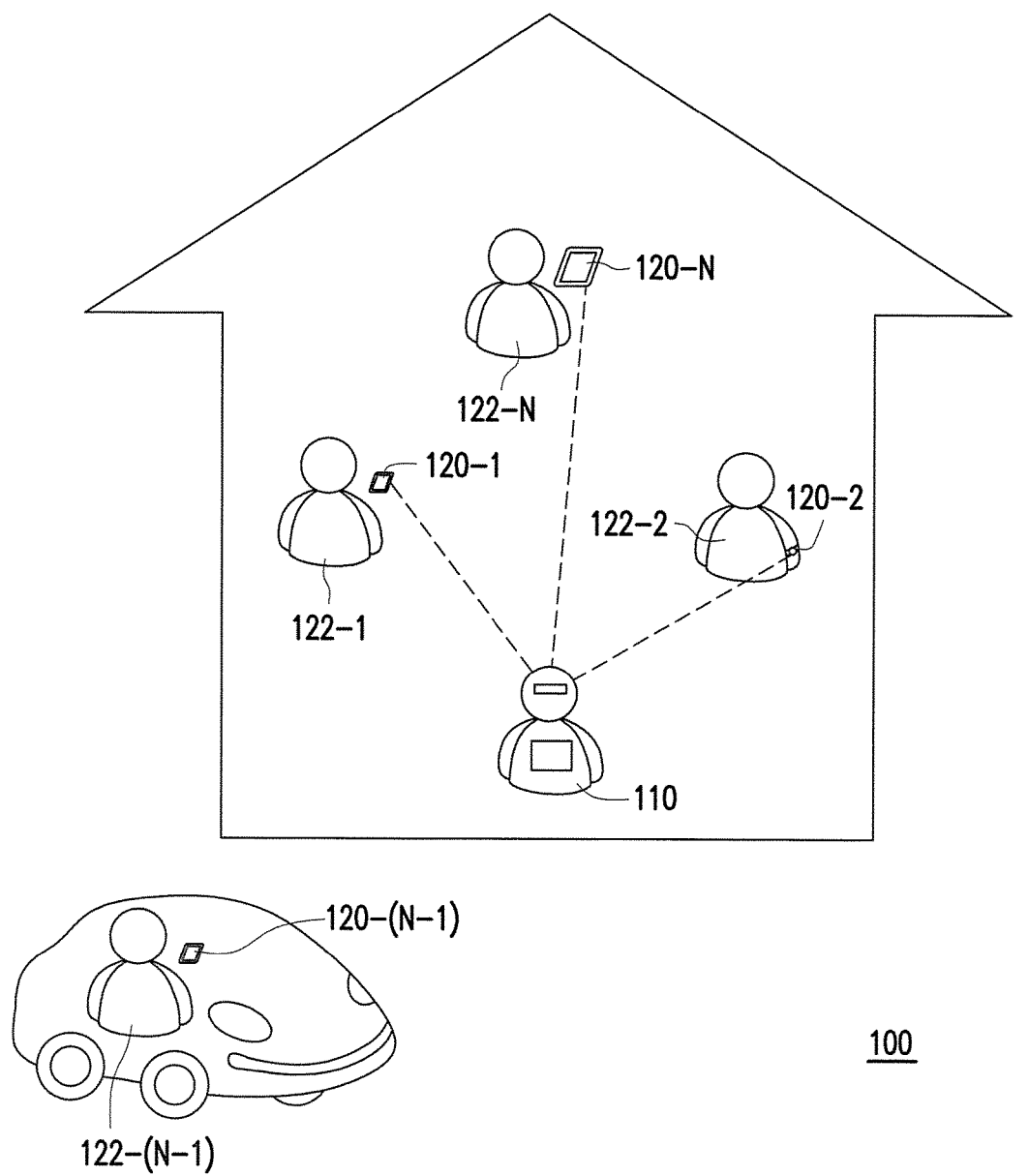
FIG. 1 is a schematic diagram showing an intelligent notification system in an embodiment.

FIG. 1 is a schematic diagram showing an intelligent notification system in an embodiment. Referring to FIG. 1, an intelligent notification system 100 includes at least one intelligent notification device 110 and at least one electronic device 120. In the embodiment, multiple electronic devices 120-1 to 120-N are used. The electronic devices 120-1 to 120-N communicate with the intelligent notification device 110, respectively. In an embodiment, a user 122-1 uses the electronic device 120-1 to exchange data with the intelligent notification device 110, a user 122-2 uses the electronic device 120-2 to exchange data with the intelligent notification device 11, and a user 122-N uses the electronic device 120-N to exchange data with the intelligent notification device 110, and so on.

In the embodiment, the intelligent notification system 100, for example, is built in an indoor digital home system. Users 122-1 to 122-N include, but not limited to, family members, non-family members or visitors to the family. The electronic devices 120-1 to 120-N include, but not limited to, smartphones, non-smart phones, wearable electronic devices, tablet computers, personal digital assistants (PDA), notebooks and other portable electronic devices that operate independently. In the embodiment, the intelligent notification device 110 communicates with the electronic devices 120-1 to 120-N via wide area network (WAN) and/or local area network (LAN) to exchange data. In such a way, the intelligent notification device 110 uses the intelligent notification method to control the electronic devices 120-1 to 120-N to notify at least one of the users 122-1 to 122-N of one or more immediate or upcoming events at a certain time point.

In the embodiment, the intelligent notification system 100 is built in the indoor digital home system. In an embodiment, at least one of the electronic devices 120-1 to 120-N is configured to a portable or un-portable electronic device in a vehicle intelligent system. The intelligent notification device 110 exchanges data with the electronic devices (for example, the electronic devices 120-(N-1)) in the vehicle intelligent system via a long distance communication (for example, WAN), to notify a driver or a passenger for a certain event.

In an embodiment, the intelligent notification device 110 include, but not limited to, a processor for digital home system, an intelligent robot, a central control system, a cloud server control center, a desktop computer and other electronic devices having a system control function (all of those are configured separately from the electronic devices 120-1 to 120-N). In another embodiment, the intelligent notification device 110 is a chipset or a processing unit that is integrated to one of the electronic devices 120-1 to 120-N, which is not limited herein.

In the embodiment, the intelligent notification system 100 are exemplified to include a plurality of electronic devices 120-1 to 120-N and a plurality of users 122-1 to 122-N, which is not limited herein. In an embodiment, the intelligent notification method is executed by one electronic device and a user intelligent notification system. In another embodiment, the intelligent notification method is executed by multiple electronic devices and a user intelligent notification system. In an embodiment, the intelligent notification system 100 synchronizes data stored in the intelligent notification device 110 and the electronic devices 120-1 to 120-N via a cloud updating technology.

Figure 2:
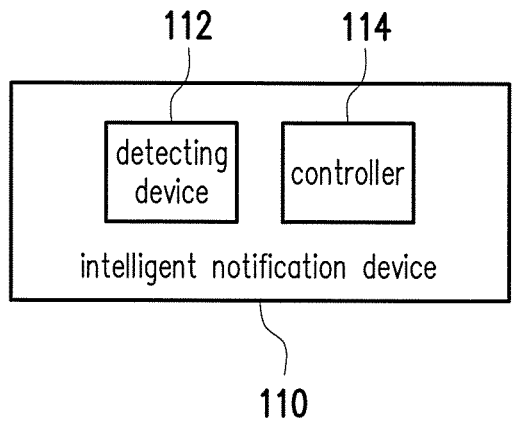
FIG. 2 is a function block diagram of an intelligent notification device in an embodiment.

FIG. 2 is a function block diagram of an intelligent notification device in an embodiment. Referring to FIG. 1 and FIG. 2, the intelligent notification device 110 includes a detecting device 112 and a controller 114. In the embodiment, the users 122-1 to 122-N take the electronic devices 120-1 to 120-N with themselves, respectively. The detecting device 112 actively detects an environmental parameter of the electronic devices 120-1 to 120-N and a status parameter of the electronic devices 120-1 to 120-N or the users 122-1 to 122-N. The detecting device 112 provides the environmental parameter and the status parameter to the controller 114. The controller 114 is electrically connected to the detecting device 112. The controller 114 controls the electronic devices 120-1 to 120-N to notify one of the events in an event schedule according to the event schedule.

In an embodiment, the electronic devices 120-1 to 120-N notify an event in different ways according to different original functions of the electronic devices (or household appliances). In an embodiment, the electronic device has a screen, the way of notifying an event is to display the event on the screen. For example, the event information is directly displayed on the screen of the electronic device. In an embodiment, the electronic device has no screen but can produce a sound, the way of notifying an event is to produce different sounds (such as, sounds with different frequencies or lengths, different music or ringtones). In an embodiment, the electronic device includes a light, the way of notifying an event is to flash the light directly, change the light color or turn the light on or off. The above ways of notifying an event are examples, other ways of notifying an event are applicable to the invention.

The controller 114 dynamically adjusts a time sequence of multiple events in the event schedule according to at least one of the environmental parameter and the status parameter. In the embodiment, the intelligent notification device 110 further includes, but not limited to, a computing module, a storage module, a communication module, a power module or other function modules.

In the embodiment, the detecting device 112 detects at least one of a temperature, a humidity, a brightness (including changes to the light and shadow around) and a gas molecule around the electronic devices 120-1 to 120-N to obtain the environmental parameter. In an embodiment, the detecting device 112 detects at least one of a temperature, a humidity, a brightness around the electronic devices 120-1 to 120-N. Therefore, weather information or time information (such as, early morning, morning, noon, afternoon, nightfall, evening and midnight) in the area is get via the detecting device 112. In an embodiment, the detecting device 112 detects a density, a concentration or a molecular weight of a gas molecular around the electronic devices 120-1 to 120-N to obtain a smell or an odor distribution in the area to determine whether a user is nearby. Therefore, in the embodiment, the detecting device 112 includes, but not limited to, an optical sensor, a temperature sensor, an image sensor, a humidity sensor, a gas molecular sensor, a smell sensor and other sensors capable of detecting the environmental parameter.

In the embodiment, the detecting device 112 detects an operating status of at least one home appliance in the area near the electronic devices 120-1 to 120-N to obtain the environmental parameter. In an embodiment, some other home appliances (such as, a television, a computer, a refrigerator, a washing machine, a telephone, an induction cooker, a table lamp and so on) are in the area near the electronic devices 120-1 to 120-N. The detecting device 112 detects the operating status of the home appliances to obtain the environmental parameter.

In an embodiment, the detecting device 112 detects the status parameter of the users 122-1 to 122-N wearing or taking along the electronic devices 120-1 to 120-N. The status parameters include activity levels, postures of the users 122-1 to 122-N, which is not limited herein. The activity levels include, but not limited to, changes of the physiological parameters of the users 122-1 to 122-N at an early, a middle and a late timepoints during exercise, rest, work, dining or sleep. The postures include, but not limited to, body postures or gestures of the users 122-1 to 122-N at an early, a middle and a late timepoints during exercise, rest, work, dining or sleep.

On the other hand, in an embodiment, the electronic devices 120-1 to 120-N analyses the life information of a corresponding one of the users 122-1 to 122-N automatically. The users 122-1 to 122-N provide the task information to the corresponding one of the electronic devices 120-1 to 120-N, respectively. Then, the electronic devices 120-1 to 120-N provide the life information and the task information to the controller 114 of the intelligent notification device 110. Thus, the controller 114 establishes the time sequence of the multiple events in the event schedule according to at least one of the life information and the task information. In an embodiment, the electronic devices 120-1 to 120-N receive the life information from corresponding one of the users 122-1 to 122-N according to a stored electronic data. In the embodiment, the electronic data includes, but not limited to, an electronic message, an electronic calendar, an e-mail and a voice message. In the embodiment, the users 122-1 to 122-N provide the task information to the corresponding one of the electronic devices 120-1 to 120-N via a voice control, a manual record or other means. In an embodiment, the task information is provided by the users 122-1 to 122-N. In another embodiment, the task information is pre-stored in the electronic devices 120-1 to 120-N or the intelligent notification device 110.

Figure 3:
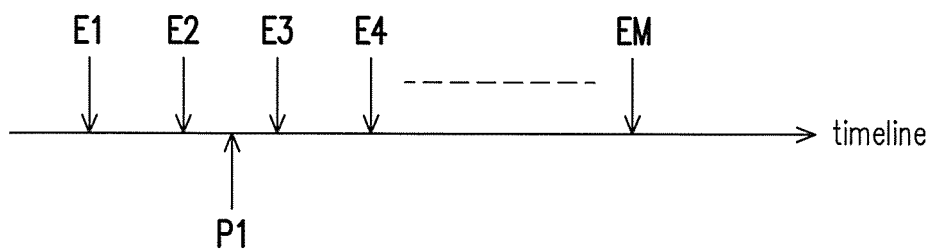
FIG. 3 is a schematic diagram showing a time sequence of multiple events in an event schedule in an embodiment.

FIG. 3 is a schematic diagram showing a time sequence of multiple events in an event schedule in an embodiment. Referring to FIG. 1 to FIG. 3, FIG. 3 shows an event schedule established by the controller 114 according to at least one of the life information and the task information. In the embodiment, the event schedule includes a plurality of events listed in the event schedule according to a time sequence. In an embodiment, the events are sequenced according to events associated with the electronic devices 120-1 to 120-N taken along with the users 122-1 to 122-N. In another embodiment, the events are sequenced independently. As a result, the controller 114 establishes a single event schedule for multiple events of multiple users 122-1 to 122-N, or establishes an event schedule of one event for an individual user.

In the embodiment, multiple events E1 to EM are sequenced on the timeline from left to right according to occurrence time. In the embodiment, four events are exemplified. The number of the events can be changed according to practical requirements. If the event E3 is related to the user 122-1, in time-point P1, the controller 114 controls the electronic device 120-1 to notify an upcoming event E3. In the embodiment, the way of notifying the event E3 can refer to the ways mentioned above, the description of which is omitted herein. In the embodiment, the events E1 to EM are the events related to the same user 122-1. In an embodiment, the events E1 to EM are the events related to different users 122-1 to 122-N, which is not limited herein.

In an embodiment, a same user corresponds to multiple electronic devices, the controller 114 controls the electronic devices to notify an event randomly, or the controller 114 controls the electronic device corresponding to the user to notify an event in the above-mentioned way. In the embodiment, when the controller 114 determines that the electronic devices 120-1 to 120-N already notifies one of events E1 to EM in the event schedule, the controller 114 deletes the notified event from the event schedule. In the embodiment, the ways of notifying one of the events E1 to EM in the event schedule by the electronic devices 120-1 to 120-N can refer to the above-mentioned ways, the description of which is omitted herein.

The controller 114 adjusts the time sequence of the other events which are not notified (the non-notified events) in the event schedule according to at least one of the life information and the task information. In an embodiment, after the time-point P1, when the controller 114 determines that the electronic devices 120-1 already notifies the events E1 to E3 in the event schedule, the controller 114 deletes the notified events E1 to E3 from the event schedule immediately or some time later. Then, the controller 114 adjusts the time sequence of the non-notified events E4 to EM in the event schedule according to at least one of the life information and the task information. In the embodiment, the notified events are deleted and the time sequence of the non-notified events in the event schedule is dynamically adjusted by the controller 114.

In the embodiment, the event schedule is established by the controller 114 according to at least one of the life information and the task information, which is not limited herein. In an embodiment, the event schedule is established by the controller 114 according to living habits of the users 122-1 to 122-N. The living habit is established by the controller 114 according to at least one of the life information and the task information of the users 122-1 to 122-N, by using Viterbi algorithm or similar dynamic algorithm (which is not limited herein).

In the embodiment, the controller 114 dynamically adjusts the time sequence of the event E1 to EM in the event schedule according to at least one of an environmental parameter, a status parameter and a busy parameter. The environmental parameter and the status parameter are detected by the detecting device 112. The busy parameter is determined by the controller 114 according to at least one of the operating statuss of the electronic devices 120-1 to 120-N, the status parameter of the users 122-1 to 122-N detected by the electronic devices 120-1 to 120-N, and the environmental parameter of the electronic devices 120-1 to 120-N.

Figure 4:
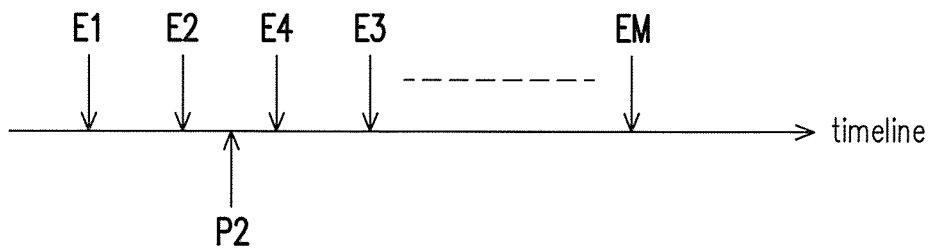
FIG. 4 is a schematic diagram showing the event schedule after dynamically adjusted in FIG. 3 in an embodiment.

FIG. 4 is a schematic diagram showing the event schedule after dynamically adjusted in FIG. 3 in an embodiment. Referring to FIG. 3 and FIG. 4, the event schedule is established by the controller 114 according to at least one of the life information and the task information. As shown in FIG. 3, the event E3 occurs before the event E4. If the controller 114 dynamically adjusts the time sequence of the events E1 to EM in the event schedule according to at least one of the environmental parameter, the status parameter and the busy parameter, the event E3 is adjusted to be after the event E4, as shown in FIG. 4. After the event schedule is dynamically adjusted, the time sequence of the events E1 to EM is adjusted partly or entirely, which is not limited herein.

In the embodiment, in time-point P2, the electronic devices 120-1 to 120-N determines to notify the corresponding users 122-1 to 122-N of one of the events (for example, event E3) in the event schedule later, the controller 114 determines whether to control the electronic devices 120-1 to 120-N to notify immediately, postpone the notification or not to notify the event E3 according to at least one of the environmental parameter and the status parameter detected by the detecting device 112, or according to the busy parameter determined by the controller 114. In an embodiment, the controller 114 determines to control the electronic devices 120-1 to 120-N to postpone the notification of the event E3, but to notify the event E4 in advance. In another embodiment, the controller 114 controls the electronic devices 120-1 to 120-N to notify the event E3 immediately, or not notify the event E3 but delete the event E3, which is not limited herein. In the embodiment, the events E3, E4 are exemplified in explaining the dynamic adjustment to the event schedule. In another embodiment, the sequence of any event (E1 to EM) in the event schedule can be dynamically adjusted, which is not limited herein.

In an embodiment, the controller 114 dynamically adjusts the time sequence of any event (E1 to EM) in the event schedule according to the living habit of the users 122-1 to 122-N, which can refer to the embodiment of FIG. 4.

Figure 5:
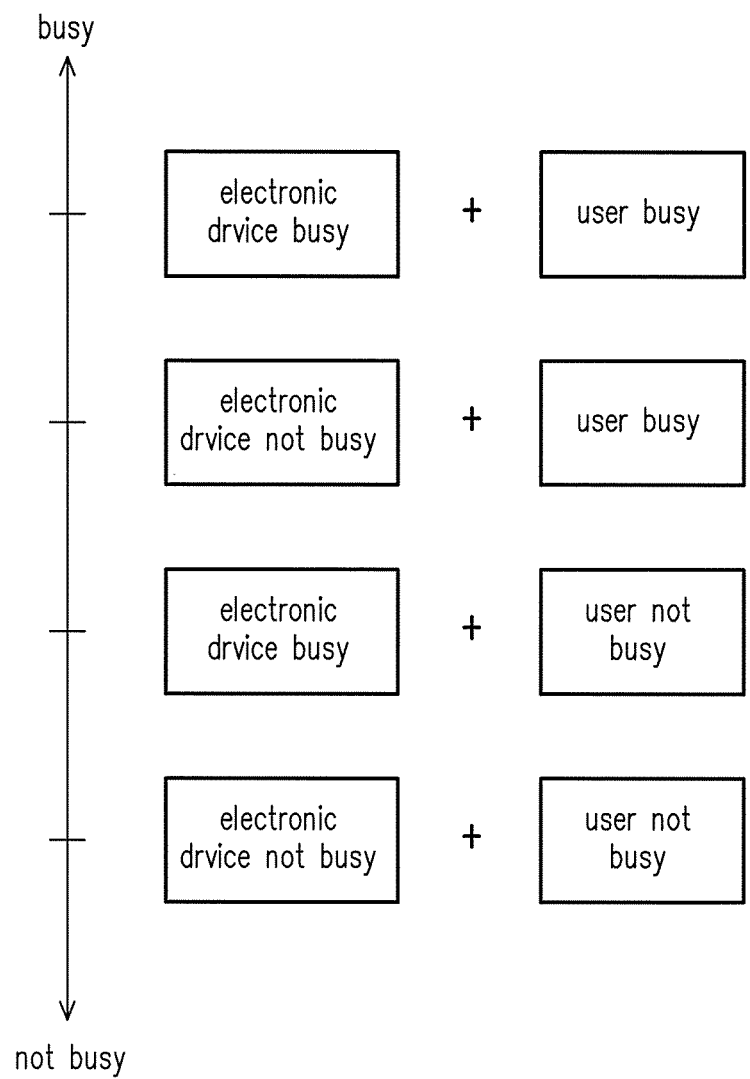
FIG. 5 is a schematic diagram showing a way of determining a busy parameter in an embodiment.

FIG. 5 is a schematic diagram showing a way of determining a busy parameter in an embodiment. Referring to FIG. 5, in the embodiment, the operating status of the electronic devices 120-1 to 120-N or the status parameter detected by the detecting device 112 are busy or not busy. Then, the controller 114 determines the busy parameter according to at least one of the operating status and the status parameter. In an embodiment, when the controller 114 determines the operating status of the electronic devices 120-1 to 120-N is busy and the status parameter of the users 122-1 to 122-N detected by the detecting device 112 is also busy, the controller 114 determines that the busy parameter is the busiest among the status combinations as shown in FIG. 5. In an embodiment, the controller 114 determines the operating status of the electronic device 120-1 to 120-N is not busy and the detected status parameter of the users 122-1 to 122-N is busy, the controller 114 determines that the busy parameter is the second busiest among the status combinations as shown in FIG. 5. In an embodiment, the controller 114 determines the operating status of the electronic devices 120-1 to 120-N is busy, and the detected status parameter of the users 122-1 to 122-N is not busy, the controller 114 determines that the busy parameter is the third busiest among the status combinations as shown in FIG. 5. When the controller 114 determines that the operating status of the electronic devices 120-1 to 120-N is not busy, and the detected status parameter of the users 122-1 to 122-N is not busy, the controller 114 determines the busy parameter is the least busy among the status combinations as shown in FIG. 5. In the embodiment of FIG. 5, the status combinations of electronic devices 120-1 to 120-N and the users 122-1 to 122-N are exemplified in determining the busy parameter by the controller 114, which is not limited herein. In an embodiment, the users 122-1 to 122-N use or wear the electronic devices 120-1 to 120-N, the controller 114 determines the busy parameter according to the environmental parameter of the electronic devices 120-1 to 120-N selectively.

In the embodiment, when the controller 114 determines the events E1 to EM of the electronic devices 120-1 to 120-N in the event schedule are already notified, the controller 114 deletes the notified event from the event schedule. The controller 114 adjusts the time sequence of the non-notified events in the event schedule according to at least one of the environmental parameter of the electronic devices 120-1 to 120-N and the status parameter of the users 122-1 to 122-N. For example, after the time-point P2 (i.e., after the controller 114 determines the electronic device 120-1 already notifies the events E1, E2 and E4 in the event schedule), the controller 114 deletes the notified events E1, E2 and E4 from the event schedule. The notified events E1, E2 and E4 are deleted immediately or some time later. Then, the controller 114 adjusts the time sequence of the non-notified events E3, E5 to EM in the event schedule according to at least one of the environmental parameter and the status parameter.

In the embodiment, the controller 114 dynamically adjusts the time sequence of the events in the event schedule according to at least one of the environmental parameter detected by the detecting device 112, the status parameter detected by the detecting device 112, the busy parameter, the life information, the task information and the living habit. In the embodiment, the controller 114 adjusts the sequence(s) of one or more event(s) in the event schedule.

In the embodiment, the intelligent notification device 110 collects and analyses the statuss of the users 122-1 to 122-N via the electronic devices 120-1 to 120-N. The intelligent notification device 110 or the electronic devices 120-1 to 120-N record(s) the living habits of the users 122-1 to 122-N and processes the task from the users. The intelligent notification device 110 collects and classifies the data and provides an appropriate suggestion according to the requirements of the users 122-1 to 122-N. The intelligent notification device 110 dynamically establishes a database according to the living habits and interactions of the users 122-1 to 122-N. The intelligent notification device 110 learns and adjusts continually to predict proper requirements of the users 122-1 to 122-N and provide suggestions accordingly. Then, the intelligent notification device 110 determines appropriately and notifies the users 122-1 to 122-N when unexpected events happen.

Figure 6:
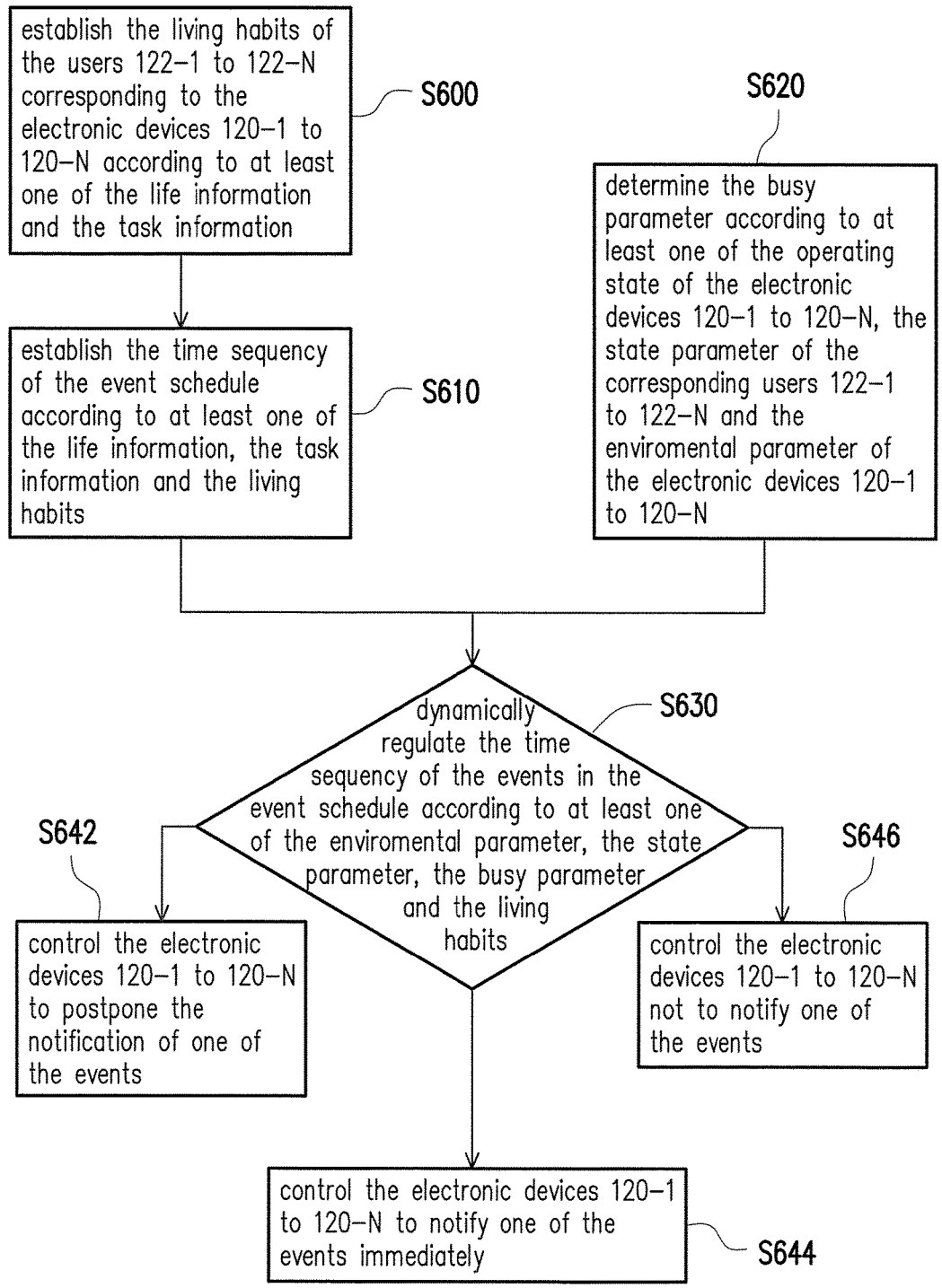
FIG. 6 is a flow chart of an intelligent notification method in an embodiment.

FIG. 6 is a flow chart of an intelligent notification method in an embodiment. Referring to FIG. 1 and FIG. 6, in the embodiment, an intelligent notification method is executed by the intelligent notification system in FIG. 1. In the embodiment, the intelligent notification method include following steps. In step S600, the controller 114 establishes the living habits of the users 122-1 to 122-N corresponding to the electronic devices 120-1 to 120-N according to at least one of the life information and the task information. Then, in step S610, the controller 114 establishes the time sequence of the events in the event schedule according to at least one of the life information, the task information and the living habits. Then, in step S620, the controller 114 determines the busy parameter according to at least one of the operating status of the electronic devices 120-1 to 120-N, the status parameter of the corresponding users 122-1 to 122-N and the environmental parameter of the electronic devices 120-1 to 120-N detected by the detecting device 112. Then, in step S630, the controller 114 dynamically adjusts the time sequence of the events in the event schedule according to at least one of the environmental parameter, the status parameter, the busy parameter and the living habits. After the event schedule is dynamically adjusted, the controller 114 executes step S642, step S644 or step S646. In the step S642, the controller 114 determines to control the electronic devices 120-1 to 120-N to postpone the notification of one of the events. In an embodiment, the electronic device 120-1 to 120-N postpones the notification by delaying the display of the event information, and the time point for notifying the event to the users 122-1 to 122-N is not limited herein. In an embodiment, in the step S644, the controller 114 determines to control the electronic devices 120-1 to 120-N to notify one of the events immediately. In an embodiment, in the step S646, the controller 114 determines to control the electronic devices 120-1 to 120-N not to notify one of the events.

The steps in the flowchart of FIG. 6 are exemplified only for illustration, which is not to limit the invention. More details for the intelligent notification method can refer to the embodiments of FIG. 1 to FIG. 5, which is omitted herein.

In sum, in the embodiments, the intelligent notification device executes the intelligent notification method to dynamically adjust the time sequence of the events in the event schedule according to at least one of the environmental parameter, the status parameter, the busy parameter, the life information, the task information and the living habit detected by the intelligent notification device. Therefore, the intelligent notification device determines to control the electronic devices to notify the event immediately, postpone the notification, or not to notify the event.

Although the invention includes been disclosed with reference to certain embodiments thereof, the disclosure is not for limiting the scope. Persons having ordinary skill in the art may make various modifications and changes without departing from the scope of the invention. Therefore, the scope of the appended claims should not be limited to the description of the embodiments described above.

What is claimed is:

1. An intelligent notification device, adapted to communicate with at least one electronic device, the intelligent notification device comprising:
   a detecting device for detecting a change of user activity level included in status parameter of at least one user of the electronic device; and
   a controller electrically connected to the detecting device to control the electronic device to notify one of a plurality of events in an event schedule according to the event schedule and to dynamically rearrange a time sequence of the events in the event schedule according to the change of user activity level,
   wherein the electronic device analyses life information of a user, receives task information and provides the life information and the task information to the controller, and when the controller determines the electronic device already notifies one of the events in the event schedule, the controller deletes the notified events from the event schedule and rearranges the time sequence of non-notified events in the event schedule according to at least one of the life information and the task information.

2. The intelligent notification device according to claim 1, wherein the controller determines to control the electronic device to notify the event immediately, postpone the notification of the event or not to notify the event according to the change of user activity level detected by the detecting device.

3. The intelligent notification device according to claim 1, wherein when the controller determines the electronic device already notifies one of the events in the event schedule, the controller deletes the notified event from the event schedule and rearranges the time sequence of other events of the events in the event schedule according to the change of user activity level.

4. The intelligent notification device according to claim 1, wherein the controller dynamically rearranges the time sequence of the events in the event schedule according to a busy parameter, and the controller determines the busy parameter according to at least one of an operating status of the electronic device, the detected status parameter and an environmental parameter.

5. The intelligent notification device according to claim 4, wherein the detecting device detects at least one of a temperature, a humidity, a brightness and a gas molecule around the electronic device to obtain the environmental parameter.

6. The intelligent notification device according to claim 4, wherein the detecting device detects an operating status of at least one house appliance in an area near the electronic device to obtain the environmental parameter.

7. The intelligent notification device according to claim 1, wherein the living habit is established according to electronic data from the electronic device, the electronic information includes at least one of an electronic message, an electronic calendar, an e-mail and a voice message.

8. The intelligent notification device according to claim 1, wherein the controller establishes a living habit for a user according to at least one of the life information and the task information, and the controller establishes and dynamically rearranges the time sequence of the events in the event schedule according to the living habit.

9. An intelligent notification method adapted to the intelligent notification system, the intelligent notification system includes at least one electronic device and an intelligent notification device, the intelligent notification method comprising:
   detecting a change of user activity level included in status parameter of at least one user of at least one electronic device;
   rearranging dynamically a time sequence of a plurality of events in an event schedule according to the change of user activity level;
   controlling the electronic device whether to notify one of the events in the event schedule according to the event schedule;
   controlling the electronic device to analysis life information;
   controlling the electronic device to receive task information;
   controlling the electronic device to provide the life information and the task information to the intelligent notification device, wherein the time sequence of the events in the event schedule is established according to at least one of the life information and the task information;
   deleting the notified event from the event schedule when the controller determines that the electronic device already notifies one of the events in the event schedule; and
   rearranging the time sequence of the non-notified events in the event schedule according to at least one of the life information and the task information.

10. The intelligent notification method according to claim 9, wherein the step of controlling the electronic device whether to notify one of the events in the event schedule according to the event schedule further comprises:
   determining whether to control the electronic device to notify the event immediately, postpone the notification of the event or not to notify the event according to the change of user activity level.

11. The intelligent notification method according to claim 9, the method further comprising:
   deleting the notified event from the event schedule when the controller determines the electronic device already notifies one of the events in the event schedule; and
   rearranging the time sequence of non-notified events in the event schedule according to the change of user activity level.

12. The intelligent notification method according to claim 9, the method further comprising:
   rearranging dynamically the time sequence of the events in the event schedule according to a busy parameter,
   wherein the busy parameter is determined according to at least one of the operating status of the electronic device, the detected status parameter and an environmental parameter.

13. The intelligent notification method according to claim 12, further comprising:
   detecting at least one of a temperature, a humidity, a lightness and a gas molecule in an around the electronic device to obtain the environmental parameter.

14. The intelligent notification method according to claim 12, wherein the step of detecting the change of user activity level included in status parameter of the electronic device further comprises:
   detecting an operating status of at least one house appliance in an area near the electronic device to obtain the environmental parameter.

15. The intelligent notification method according to claim 9, wherein the step of controlling the electronic device to analysis the life information of the user further comprises:
   electronic data from the electronic device, wherein the electronic information includes at least one of an electronic message, an electronic calendar, an e-mail and a voice message.

16. The intelligent notification method according to claim 9, the method further comprising:
   establishing a living habit according to at least one of the life information and the task information,
   wherein the time sequence of the events in the event schedule is established and dynamically rearranged according to the living habit.

* * * * *